United States Patent
Bitzi et al.

(10) Patent No.: US 12,547,184 B2
(45) Date of Patent: Feb. 10, 2026

(54) METHOD FOR CONTROLLING A FLIGHT-CAPABLE DRONE IN AN ELEVATOR SHAFT OF AN ELEVATOR SYSTEM, AND ELEVATOR SYSTEM INSPECTION ARRANGEMENT

(71) Applicant: Inventio AG, Hergiswil (CH)

(72) Inventors: Raphael Bitzi, Lucerne (CH); Alberto Chiappa, Saint-Sulpice (CH); Martin Kusserow, Lucerne (CH); Lucas Walti, Lausanne (CH)

( * ) Notice: Subject to any disclaimer, the term of this patent is extended or adjusted under 35 U.S.C. 154(b) by 55 days.

(21) Appl. No.: 18/715,170

(22) PCT Filed: Nov. 22, 2022

(86) PCT No.: PCT/EP2022/082686
§ 371 (c)(1),
(2) Date: May 31, 2024

(87) PCT Pub. No.: WO2023/104494
PCT Pub. Date: Jun. 15, 2023

(65) Prior Publication Data
US 2025/0028331 A1    Jan. 23, 2025

(30) Foreign Application Priority Data
Dec. 7, 2021  (EP) .................................... 21212685

(51) Int. Cl.
*G05D 1/467*    (2024.01)
*G05D 1/247*    (2024.01)
(Continued)

(52) U.S. Cl.
CPC ............. *G05D 1/467* (2024.01); *G05D 1/247* (2024.01); *G05D 2105/89* (2024.01); *G05D 2107/50* (2024.01); *G05D 2109/254* (2024.01)

(58) Field of Classification Search
CPC .... G05D 1/467; G05D 1/247; G05D 2105/89; G05D 2107/50; G05D 2109/254; B66B 5/0087
See application file for complete search history.

(56) References Cited

U.S. PATENT DOCUMENTS

2020/0072613 A1* 3/2020 Kuzmanovic ........ G01C 21/206

FOREIGN PATENT DOCUMENTS

| JP | 2018203486 A | 12/2018 |
|----|--------------|---------|
| JP | 2019043755 A | 3/2019  |

(Continued)

*Primary Examiner* — Brodie J Follman
(74) *Attorney, Agent, or Firm* — Schlee IP International, PC; Alexander R. Schlee; Pascal A. Schlee

(57) ABSTRACT

A method for controlling a flight-capable drone in an elevator shaft of an elevator system uses an elevator system inspection arrangement configured for carrying out the method. The method comprises the following steps: receiving elevator shaft segment information provided by the elevator system that indicates which volume segment of the elevator shaft is currently designated to be off-limits for the drone; and controlling the drone along a flight path automatically determined by the drone, wherein the drone determines the flight path such that the drone travels exclusively outside of the volume segment designated as off-limits for the drone, wherein the drone determines the flight path taking into account the received elevator shaft segment information. By exchanging the elevator shaft segment information with the elevator system, the drone is able to initiate evasive maneuvers in good time in order to prevent collisions with fast-moving components of the elevator system.

13 Claims, 1 Drawing Sheet

(51) Int. Cl.
    *G05D 105/80*     (2024.01)
    *G05D 107/50*     (2024.01)
    *G05D 109/25*     (2024.01)

(56) References Cited

FOREIGN PATENT DOCUMENTS

| | | | |
|---|---|---|---|
| WO | 2017207597 | A1 | 12/2017 |
| WO | 2018066051 | A1 | 4/2018 |
| WO | 2019121859 | A1 | 6/2019 |

\* cited by examiner

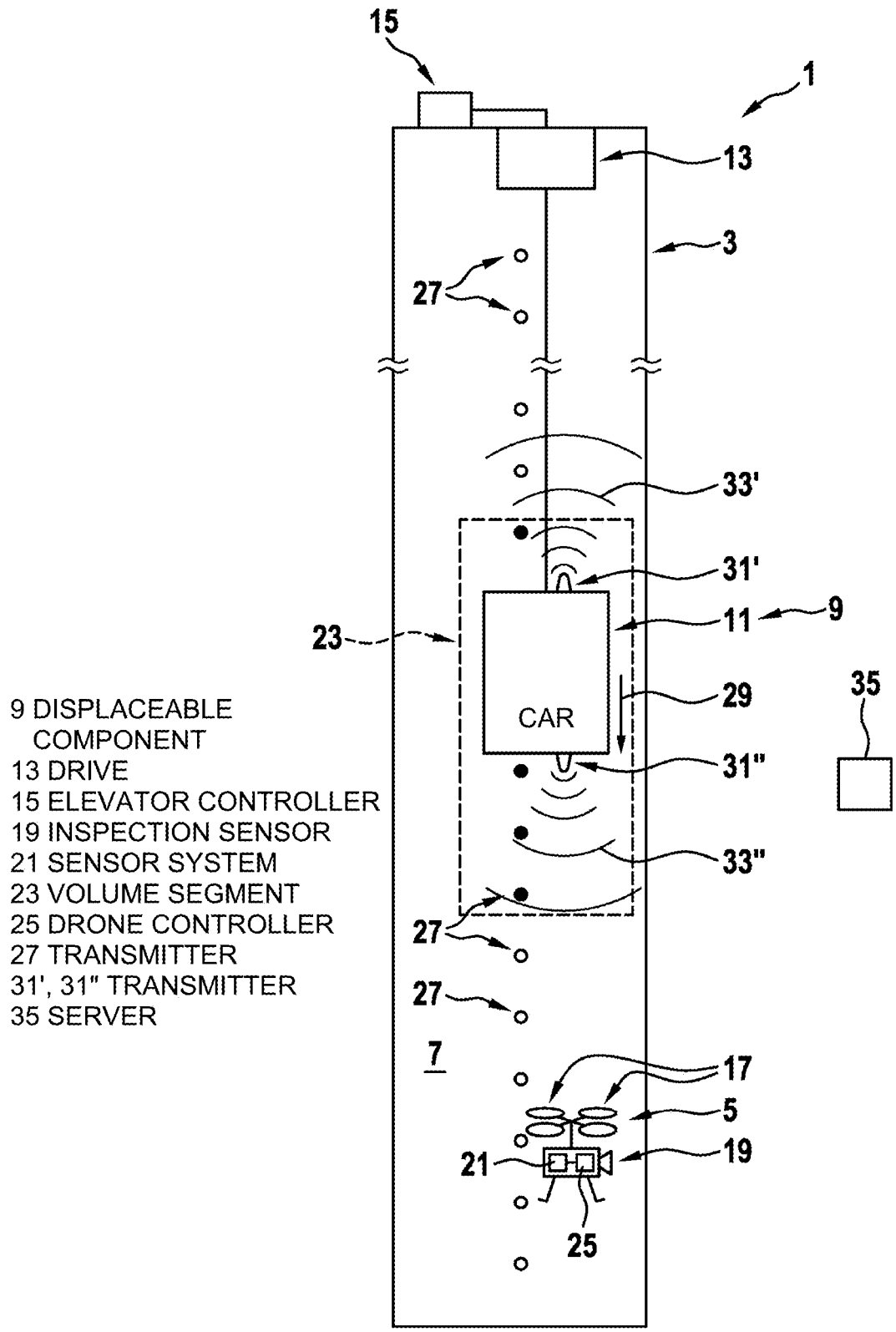

METHOD FOR CONTROLLING A FLIGHT-CAPABLE DRONE IN AN ELEVATOR SHAFT OF AN ELEVATOR SYSTEM, AND ELEVATOR SYSTEM INSPECTION ARRANGEMENT

FIELD

The invention relates to a method for controlling a flight-capable drone in an elevator shaft of an elevator system. Furthermore, the invention relates to an elevator system inspection arrangement with which an elevator shaft can be inspected with the aid of a flight-capable drone.

BACKGROUND

Elevator systems generally have at least one elongated elevator shaft in which a displaceable component such as an elevator car or a counterweight can be moved along a longitudinal direction of the elevator shaft. The longitudinal direction usually runs vertically so that the elevator car or the counterweight can be moved between different floors of a building. Elevator shafts can extend thereby over considerable heights.

During the construction of an elevator system or during maintenance of the elevator system, it may be necessary to inspect the elevator shaft. Conventionally, a technician had to move along the entire elevator shaft in order to be able to visually check, for example, elevator components, holders, anchorings, etc. at different heights in the elevator shaft. In this case, the technician could, for example, be moved vertically together with the elevator car along the elevator shaft, while standing on a roof of the elevator car. However, this procedure required a considerable amount of work by the technician, among other things. In addition, this procedure is associated with not inconsiderable hazards for the technician.

Approaches have been developed for inspecting the elevator shaft of an elevator system with the aid of a flight-capable drone. For example, WO 2017/207597 A1 describes an approach for remote-controlled monitoring and inspection of an elevator. Here, an autonomously flight-capable object with at least one sensor is sent to the elevator system, and can then move along the elevator shaft. In this case, data can be collected by means of the sensor, which data can then be sent, for example, to a remote elevator control center in order to be able to monitor or inspect the elevator system remotely.

However, it has been observed that problems can arise when the drone is moving through the elevator shaft. In particular, it has been recognized that flying a drone along the elevator shaft in such a way that no collisions occur with components of the elevator system, in particular no collisions with displaceable components such as the elevator car and/or the counterweight, is a task not easily solved.

WO 2018/066051 A1 describes an elevator controller of an elevator system which can receive an inspection request from a drone, and can bring a car into a specific position on the basis of this inspection request.

JP 2018203486 A describes an inspection system for an elevator system in which a drone is controlled by an elevator controller of the elevator system.

JP 2019043755 A describes an inspection system for an elevator system in which a drone is used for the inspection of one of a plurality of elevator shafts situated next to one another. In order for the drone not to be exposed to excessive lateral wind movements when an elevator car passes in an adjacent shaft, before such passage past the drone, a command is transmitted to the drone to bring it into a safe position.

SUMMARY

There may be a need to largely avoid the aforementioned problems. In particular, there may be a need for a method for controlling a flight-capable drone in an elevator shaft of an elevator system, in which collisions of the drone with components of the elevator system can be prevented in a simple and reliable manner. Furthermore, there may be a need for an elevator system inspection arrangement which makes possible a flight of a drone while preventing such collisions in a simple manner.

A need of this kind can be satisfied by the subject matter according to the advantageous embodiments defined in the following description, as well as the accompanying drawings.

A further aspect of the invention relates to a method for controlling a flight-capable drone in an elevator shaft of an elevator system. The method comprises at least the following method steps, preferably in the stated sequence:

(i) receiving elevator shaft segment information provided by the elevator system indicating which volume segment of the elevator shaft is currently designated as off-limits for the drone by the elevator system; and
(ii) controlling the drone along a flight path automatically determined by the drone, wherein the drone determines the flight path in such a way that the drone travels exclusively outside the volume segment designated as off-limits for the drone.

The drone determines the flight path taking into account the elevator shaft segment information received.

According to a second aspect of the invention, an elevator system inspection arrangement is described, which comprises an elevator system and a flight-capable drone. The elevator system comprises an elevator shaft, at least one component that can be displaced in the elevator shaft, a drive for moving the displaceable component, and an elevator controller for controlling displacement movements of the displaceable component. In this case, the elevator system inspection arrangement is configured to carry out or monitor a method according to an embodiment of the first aspect of the invention.

Possible features and advantages of embodiments of the invention can be regarded, inter alia and without limiting the invention, as being based upon the concepts and findings described below.

In brief, and without restricting the aspects of the invention, an idea on which the inventive aspects described herein are based can be considered to be that, in principle, flight-capable drones are known, and these can be moved within an elevator shaft for inspection purposes; however, it has been recognized that under the conditions prevailing in an elevator shaft it can be difficult to fly the drone along the elevator shaft without a collision. In particular, collisions with the rapidly moving elevator car or the counterweight appear to be difficult to avoid for the drone. It is conceivable in principle to equip the drone with a sensor system allowing a controller of the drone to fly the drone autonomously using sensor signals of this sensor system, and to accordingly avoid collisions. However, both the sensor system and the controller must be designed relatively complex in such an implementation, such that the costs of such an approach are increased and/or a reliability of the drone may be reduced due to its complexity. It was then recognized that if the drone receives additional information from the elevator system, the drone will be able to perform a collision-free flight along the elevator shaft with significantly simpler means, in particular with a simpler sensor system and/or a simple controller. In particular, the drone can determine its flight path without collisions in a simple manner if information is provided by the elevator system. This information is referred to herein as elevator shaft segment information, and indicates which volume segment of the elevator shaft should be off-limits for the drone. If the drone has access to the elevator shaft segment information, the drone will be able to determine a flight path along which it can be moved through the elevator shaft without collisions, in a significantly simpler manner.

Possible embodiments of the invention are described in detail below.

Flight-capable drones have been known for a long time, and can be optimized for different purposes. Such drones can be capable of launching vertically. In addition, such drones can move both vertically and horizontally within a volume. The drones can be equipped, for example, as helicopters, in particular as multicopters, with one or more propellers. Such propellers can, for example, guide an air flow generated by the rotating propeller in different directions, by suitably positioning propeller blades and thus generating a directable thrust. If a plurality of propellers is provided on the drone, a pushing direction and thus a flight direction of the drone can also be controlled by different rotational speeds of the different propellers.

Basically, drones can be remotely controlled by a person, for example using a wireless controller. For this purpose, however, the person must be specially trained and also concentrate on controlling the drone during the drone flight.

Drones have therefore been developed which can move autonomously, at least in certain situations. Such drones usually require a complex sensor system with a plurality of sensors on board the drone. Such sensors can comprise, for example, one or more cameras, distance sensors such as ultrasonic sensors, radar sensors, lidar sensors, etc., and/or microphones. In addition, the drone generally requires a complex controller, which is able to evaluate the signals supplied by the sensors sufficiently quickly and reliably in order to accordingly allow the drone to fly autonomously along a flight path determined by the controller.

It has been recognized that for a specifically desired application in which the flight-capable drone is to be moved within the scope of an inspection along an elevator shaft, controlling the drone, on the one hand, involves requirements specific to the elevator shaft. However, on the other hand, this can also be considerably simplified by a clever use of information already available and by providing this information to the drone.

In particular, it was recognized that flying the drone within the elevator shaft can be risky, in particular since typically displaceable components such as the elevator car and/or the counterweight can move at relatively high speeds in the elevator shaft. In particular, it was recognized that the speeds at which these components move can be so high that the drone would have to recognize the corresponding component at relatively large distances away in order to be able to move out of the way in time considering its own reaction capabilities, and thus to be able to avoid a collision. Among other things, this can be made difficult by the fact that drones are usually designed in such a way that the capabilities of its sensor system and controller are adapted to the flying capabilities of the drone—i.e., the sensor system and the controller usually only need to be designed in such a way that the drone, with the aid of the sensor signals, can detect stationary obstacles sufficiently quickly, in order to be able to fly a flight path around such obstacles using its flying abilities, and thus to avoid collisions. However, in the case of moving, i.e. non-stationary obstacles, such a design of the sensor system and the controller generally does not suffice to be able to guarantee an autonomous flight without collisions.

In view of this state of knowledge, it is therefore proposed here to allow the drone to determine its flight path not solely on the basis of signals of its own sensor system. Instead, the drone should be able to receive additional information which is provided by the elevator system, in particular by an elevator controller of the elevator system. This information is intended to specify a volume segment, selected by the elevator system as the elevator shaft segment information, in which the drone is currently not allowed to fly, and which is therefore designated as off-limits for the drone. As described in more detail below for different embodiments, the elevator system can generate such elevator shaft segment information in various ways, and transmit the information to the drone. The elevator system can accordingly utilize information which, for example, is already known in the elevator controller of the elevator system. For example, information is generally present in the elevator controller regarding the position at which the elevator car and/or the counterweight are currently located, and whether or how fast these movable components are currently moving along the elevator shaft. From this, the drone can also additionally derive where a so-called traveling cable fastened to the elevator car at the bottom and a so-called compensating cable are located.

Taking into account the elevator shaft segment information provided by the elevator system, the drone can determine its future flight path in a relatively simple manner in such a way that the volume segment which is off-limits for it is reduced, such that in particular collisions with components of the elevator system in this volume segment can be prevented.

The volume segment which is off-limits for the drone can take various forms. In particular, the volume segment can be selected by the elevator system in such a way that components, in particular moving components, of the elevator system are located therein. Different parameters can be taken into account when selecting the dimensions of the volume segment. For example, dimensions of an elevator component located in the volume segment, a speed at which this elevator component is moving, and/or reaction speeds and flying capabilities of the drone can be taken into account. Accordingly, the volume segment can be selected large enough to enable the drone to swerve away quickly, and thus prevent a collision with the elevator component located in the volume segment.

In particular, the volume segment can extend over an entire cross-section of the elevator shaft, and comprise a height portion of the elevator shaft in which the elevator component to be protected is located. Such an embodiment of the volume segment has the effect that the drone can freely move only in a volume below the elevator component or above the elevator component, depending on where it is initially located, but cannot be moved vertically past the elevator component. Alternatively, the volume segment may only fill a part of the entire cross-section of the elevator shaft, so that the drone can select a flight path through an adjacent volume segment which is not off-limits in order to be able to fly laterally past the elevator component. For example, the off-limits volume segment can simply have a cross-section which corresponds to a cross-section (footprint) of a travel path of the elevator car or of a travel path of the counterweight, so that the drone can fly through a respectively adjacent volume which is not off-limits, depending on whether it must evade the elevator car or the counterweight. In view of the typically cuboid design of the elevator shaft, the off-limits volume segment can, for example, be cuboid, wherein in principle other volume shapes are likewise possible. It is also possible for the drone to divert into a recess in a wall of the elevator shaft or an adjacent elevator shaft.

According to one embodiment, the elevator shaft segment information can be provided by the elevator system on the basis of location/movement information which indicates where a component of the elevator system that can be displaced in the elevator shaft is currently located and/or where the component of the elevator system that can be displaced in the elevator shaft is currently moving.

In other words, when ascertaining the elevator shaft segment information, the elevator system can take into account knowledge about a current position and/or a current movement direction and/or a current movement speed of the elevator car or the counterweight. Information about these current operating parameters can generally be read from the elevator controller in a simple manner. Due to the fact that the operating parameters mentioned are taken into account when ascertaining the elevator shaft segment information, the volume segment indicated as off-limits for the drone can be defined in such a way that only sub-volumes of the elevator shaft are off-limits in which there is actually a risk of collision with elevator components located there. The elevator shaft segment information is in particular transmitted directly or indirectly from the elevator controller to the drone.

Here, for example, a height portion of an off-limits volume segment can be selected to be greater the faster the elevator component is moving. In addition, the off-limits volume segment can extend in a first direction in which the elevator component moves up to a first position, and extend in a second, opposite direction up to a second position, wherein the first position can be further away from the current position of the elevator component than the second position. In other words, the off-limits volume segment can extend further beyond the current position of the elevator component in the direction in which the elevator component is currently moving than in the opposite direction.

Taking into account elevator shaft segment information determined in this way, the drone can then determine its flight path in such a way that collisions with the displaceable elevator component can be reliably avoided.

According to one embodiment, the elevator shaft segment information can be provided by the elevator system on the basis of relative information which indicates where a component of the elevator system that can be displaced in the elevator shaft is currently located relative to the drone, and/or how the component of the elevator system that can be displaced in the elevator shaft is currently moving relative to the drone.

In other words, when determining the elevator shaft segment information, not only can the current absolute position of the displaceable elevator component and possibly its direction of movement be taken into account, but also its relative position and its relative movement in relation to the current position or movement of the drone. For example, the off-limits volume segment can be selected to be greater in cases where it is detected that the elevator component and the drone are already close to one another, and are moving toward one another, than in cases in which the elevator component and the drone are moving away from one another. A risk of collision can accordingly be further reduced.

According to one embodiment, the elevator shaft segment information can be provided by the elevator system taking into account speed information, wherein the speed information indicates at which speed a component of the elevator system that can be displaced in the elevator shaft is currently moving through the elevator shaft and/or at which speed the drone can at most move within the elevator shaft.

In the first case, in which the speed information indicates the current speed of the displaceable elevator component, the elevator shaft information can, for example, specify that a larger volume segment is off-limits for the drone in proportion to how fast the elevator component is moving.

Alternatively or additionally, in the second case, when determining the off-limits volume segment, what can be taken into account is how fast the drone can move at most—i.e., the flight capabilities that the drone has—in order to be able to evade the elevator component, if necessary. The slower the drone can move, the greater should generally be the volume segment which is off-limits for it, so that it can still evade an elevator component moving towards it.

According to one embodiment, the elevator shaft segment information can be provided by virtue of the fact that a signal that can be received by the drone is generated locally within the volume segment of the elevator shaft which is currently designated by the elevator system as off-limits for the drone, and this signal is different than is the case outside this volume segment.

In other words, the elevator shaft segment information of the drone can be provided in a very simple manner as only one of two possible signals. A first signal indicates that the position at which this first signal is received is within the off-limits volume segment, whereas a second signal indicates that this position is outside the off-limits volume segment. If necessary, one of these two signals can also be designed as a zero signal, i.e. as the absence of a signal, or a signal that cannot be received at the specified position. Accordingly, for example, the absence of reception of a signal of the drone can signal that it is currently located outside the volume segment which is off-limits for it; whereas reception of a signal indicates that it is currently in an off-limits volume segment, and therefore has to suitably select its flight path in order to leave the off-limits volume segment.

With elevator shaft segment information simply configured in this way, it is possible to keep a simple design for the sensors—by means of which this information is to be received—or for an evaluation logic—with which this information is to be evaluated.

According to one embodiment, a plurality of transmitters can be arranged in the elevator shaft, wherein each transmitter is arranged at a different height along the elevator shaft. The elevator shaft segment information can then be provided by transmitters emitting a different signal if they are currently in the volume segment of the elevator shaft which is currently designated by the elevator system as off-limits for the drone than is emitted by transmitters outside this volume segment.

In other words, the elevator system can be configured to generate the elevator shaft segment information using a plurality of transmitters, and to transmit this to the drone. In this case, the transmitters can be positioned along the elevator shaft at different heights. Each of the transmitters can emit a signal that can be received by the drone when it is sufficiently close to the transmitter. In this case, each transmitter can be designed to assume at least two different transmission states, i.e., for example, to emit a signal or to emit no signal, or to emit a first signal or a second signal. Depending on the signal transmitted, the drone can be warned that it is located within or outside the volume segment which is off-limits for it when this signal is received.

The transmitters may possibly also emit a plurality of different signals. As a result, for example, the drone can be signaled as to whether it is located at the edge of, or even further into, the interior of an off-limits volume region. In addition, the drone may possibly recognize, by observing temporal changes of the signal received therefrom, whether it is currently moving toward a center of the off-limits volume segment or away from this center. Supplementary information obtained therefrom can be used by the drone to suitably determine its further flight path, in order to prevent collisions with elevator components in the off-limits volume segment.

The transmitters can emit any types of signals that can be received by the drone. For example, transmitters can emit electromagnetic signals, light signals, acoustic signals or the like. The transmitters can correspond with an elevator controller of the elevator system, and can be controlled by the same for emitting the signals.

According to one embodiment, at least one transmitter can be arranged on a component of the elevator system that can be displaced in the elevator shaft. The elevator shaft segment information can be provided by a signal being emitted by the transmitter, which signal decreases as a function of a distance from the displaceable component.

In other words, the elevator shaft segment information can be provided by the elevator system with the aid of a transmitter which is located on the elevator car or the counterweight, and moves along with this displaceable component. In this case, the transmitter should be configured to emit a signal which greatly decreases as a function of a distance from the sensor. The signal emitted by the transmitter can be received by the drone. Distance-dependent signal variations occurring—in particular, signal intensities decreasing with increasing distance from the sensor—can be detected by the drone. The drone can then recognize by analyzing the signals whether it is located within or outside an off-limits volume segment. If necessary, the drone can also recognize by analyzing signal variations whether a distance between itself and the transmitter is currently decreasing or increasing, and can then suitably adapt its flight path to prevent collisions with the displaceable elevator component.

The transmitter can emit any signals that can be received by the drone. It is important in this case that the signals decrease sufficiently strongly as the distance from the transmitter increases, so that this can be detected by a sensor or receiver provided in the drone, and information about the current distance from the transmitter can be determined on the basis thereof. The signals can be, for example, electromagnetic signals, light signals, acoustic signals or the like. The signals can be emitted in such a way that their intensity decreases proportionally to a distance from the transmitter, for example linearly with the distance, quadratically with the distance, or cubically with the distance.

According to a specific embodiment, the elevator shaft segment information can be provided by the transmitter transmitting a different signal in a direction in which the displaceable component is currently moving than in an opposite direction.

For example, the transmitter can emit a signal that is emitted in the current direction of movement of the elevator car or the counterweight, with a different frequency, a different color, a different pitch, etc. than in an opposite direction. The drone can then recognize whether the moving elevator component is coming toward it or is moving away from it, and accordingly can suitably adapt its flight path or plan evasive maneuvers.

A plurality of transmitters may possibly be attached to the displaceable elevator component. For example, a first transmitter can be arranged on an upwardly directed surface of the elevator component, i.e., for example, a roof of the elevator car, and can be designed to transmit signals upwards. A second transmitter can be arranged on a downwardly directed surface of the elevator component, i.e., for example, on a base of the elevator car, and can be designed to emit signals downwards. Depending on the current direction of movement of the elevator component, the two transmitters can emit different signals.

The elevator shaft segment information is in particular only provided when the displaceable component, i.e. the elevator car and the counterweight, is moving. An unnecessary emission of the elevator shaft segment information can thus be avoided. If the displaceable component is stationary, i.e. is not moving, the drone can prevent a collision with the displaceable component on the basis of the sensor signals of its own sensor system.

According to one embodiment, the elevator shaft segment information can be provided by the elevator system as component location/movement information which indicates where a component of the elevator system that can be displaced in the elevator shaft is currently located and/or where the component of the elevator system that can be displaced in the elevator shaft is currently moving. The drone can then determine the flight path taking into account both the received component location/movement information and drone location/movement information which indicates where the drone is currently located in the elevator shaft and/or where the drone is currently moving in the elevator shaft.

In other words, the elevator shaft segment information can contain specific information about where the elevator car or the counterweight is currently located and in which direction it is possibly currently moving. This component location/movement information can be transmitted wirelessly to the drone. For example, this information can be transmitted directly from the elevator controller via a wireless network broadcast in the elevator shaft. Alternatively, this information can first be transmitted from the elevator controller to a center located outside the elevator system, such as a monitoring center or a data cloud, from where it is then forwarded to the drone. For this purpose, the drone can have internet access, for example.

In addition to the component location/movement information relating to the elevator component, the drone can in this case also have drone location/movement information which indicates where the drone is currently located and to where it is currently moving. Taking into account both the component location/movement information and the drone location/movement information, the drone can then determine the volume segment which is off-limits for it within the elevator shaft. In this case, the drone can optionally take into account its own reaction capabilities and/or flight capabilities in order to be able to determine a future flight path such that collisions are avoided.

The approaches described above for providing, transmitting, and/or receiving the elevator shaft segment information can be implemented separately or combined.

It should be noted that embodiments of the invention are described herein in part with reference to a method for controlling a flight-capable drone and in part with reference to a correspondingly designed elevator system inspection arrangement. Those skilled in the art can recognize that the described embodiments can be modified in a suitable manner and/or transferred and adapted to other embodiments of the invention in order to arrive at further embodiments of the invention.

It would also be possible for the drone to restrict a possible movement space of the elevator car of the elevator system.

Embodiments of the invention will be described below with reference to the accompanying drawing, with neither the drawing nor the description being intended to be interpreted as limiting the invention.

DESCRIPTION OF THE DRAWINGS

FIG. 1 shows an elevator system inspection arrangement according to an embodiment of the present invention.

The drawing is merely schematic and is not to scale. The same reference signs indicate the same or equivalent features.

DETAILED DESCRIPTION

FIG. 1 shows an elevator system inspection arrangement 1 with an elevator system 3 and a flight-capable drone 5.

The elevator system 3 comprises an elevator shaft 7. A displaceable component 9 in the form of an elevator car 11 can move in the elevator shaft 7. The elevator car 11 is moved by a drive 13. An operation of the drive 13 is controlled by an elevator controller 15. Although not shown in the example for reasons of clarity, the elevator system 3 can furthermore have a further displaceable component 9 in the form of a counterweight.

In the example shown, the drone 5 is designed as a quadrocopter. It has four separately controllable propellers 17. A total thrust generated by the propellers 17 can be steered in different directions due to differently controlled rotational speeds of the propellers 17, so that the drone 5 can be flown both vertically and horizontally in any direction. The drone 5 is equipped with at least one inspection sensor 19. Using this inspection sensor 19, the drone can inspect the elevator shaft 7. For example, the inspection sensor 19 can be designed as a camera. Furthermore, the drone 5 has an integrated sensor system 21. This integrated sensor system 21 is configured to receive signals by means of which the elevator system 3 provides elevator shaft segment information.

The elevator system 3 is configured to generate the elevator shaft segment information and then to provide it in the elevator shaft 7 in such a way that it can be received by the drone 5. The elevator shaft segment information indicates which volume segment 23 of the elevator shaft 7 is currently designated as off-limits for the drone 5 by the elevator system 3.

In this case, when the elevator shaft segment information is generated, at which position the elevator car 11 is currently located within the elevator shaft 7 can be taken into account and in which direction and at which speed the elevator car 11 is currently moving. Corresponding component location/movement information can be made available to the elevator system 3 by the elevator controller 15.

In addition, information can be provided to the elevator system 3 via the drone 5. For example, the elevator system 3 can be informed about which flight capabilities the drone 5 has—i.e., for example, at which maximum speed the drone 5 can move within the elevator shaft 7. Accordingly, when determining the volume segment 23 which is off-limits for the drone 5, the elevator system 3 can take into account how fast the drone 5 can evade, for example, the approaching elevator car 11 on the basis of its flying abilities.

In addition, it can be provided that the drone 5 actively transmits information to the elevator system 3. For example, the drone 5 can inform the elevator system 3 where it is currently located within the elevator shaft 7 and in which direction and at which speed it is currently flying. The elevator system 3 can also take into account such drone location/movement information when determining the volume segment 23 to be designated as off-limits for the drone 5. Accordingly, the elevator shaft segment information can be provided based relative information which indicates where the elevator car 11 is currently located relative to the drone 5 and/or how the elevator car 11 and the drone 5 are currently moving relative to one another.

While the drone 5 is flying through the elevator shaft 7 within the scope of an inspection of the elevator system 3, it can continuously receive the elevator shaft segment information provided by the elevator system 3. The information can then be evaluated in a drone controller 25. Taking into account the elevator shaft segment information, the drone controller 25 can then automatically determine a flight path in which the drone 5 travels exclusively outside the off-limits volume segment 23. In this way, a collision with the elevator car 11 located within the off-limits volume segment 23 can be avoided.

The embodiment shown in the drawing illustrates three technologies by means of which the elevator system 3 can provide the elevator shaft segment information. The three technologies can be implemented in combination or separately.

In a first technology, numerous transmitters 27 are arranged vertically along the elevator shaft 7. The transmitters 27 can be attached uniformly distributed along the entire height of the elevator shaft 7, for example on a wall of the elevator shaft 7. For example, the transmitters 27 can be arranged at regular intervals, for example in each case with 1 m distance between them. Each of the transmitters 27 can emit a signal into its immediate surroundings. The transmitter 27 can vary at least between two signal states. A signal state (shown in the drawing as a filled circle) should indicate that the position of the transmitter 27 or the signals emitted by it is within the off-limits volume segment 23. Another signal state (shown in the FIGURE as an empty circle) indicates that the position of the transmitter 27 or the emitted signals is located outside the off-limits volume segment 23.

The transmitters 27 and/or their signal states can be activated and/or switched by the elevator controller 15. The transmitter 27 which is currently located in the vicinity of the elevator car 11 can accordingly be switched into the signal state which indicates the off-limits volume segment 23, whereas the more remote transmitter 27 can be switched to the other signal state.

In this case, it can also be taken into account in which direction of movement 29 the elevator car 11 is currently moving. In this direction of movement 29, a portion of the off-limits volume segment 23 that extends vertically beyond the elevator car 11 can be selected to be greater than in the opposite direction, and accordingly the further transmitters 27 can be switched into the corresponding signal state. As a result, the drone 5 can be signaled sufficiently early that it is moving into the off-limits volume segment 23 around the approaching elevator car 11, or is coming close to it, so that the drone 5 can initiate an evasive maneuver in good time. In this case, the drone 5 can divert into a region next to the off-limits volume element 23, i.e. next to the elevator car 11. However, it is also possible for the drone 5 to divert into a recess (not shown) in a wall of the elevator shaft 7, or into an elevator shaft (not shown) arranged next to the elevator shaft 7.

In a second technology, transmitters 31', 31" are attached directly to the elevator car 11, so that these transmitters 31', 31" move along with the elevator car 11. The transmitters 31', 31" emit signals 33', 33", the intensity of which decreases successively as a function of the vertical distance from the elevator car 11. In this way, the elevator system 3 can provide a volume segment 23 which is off-limits for the drone 5 as elevator shaft segment information. The transmitters 31', 31" emit the signals 33', 33" in particular only when the elevator car 11 is moving. If the elevator car 11 is stationary, no signals 33', 33" will be emitted. The drone 5 which receives the signals 33', 33" emitted by the transmitters 31', 31" can accordingly recognize on the basis of the intensity of the signals 33', 33" whether it is still sufficiently far away from the elevator car 11 or whether signals are being received above a predetermined intensity limit value, indicating that the drone 5 is at risk of entering the off-limits volume segment 23, and thus needs to initiate an evasive maneuver.

In this case, the transmitters 31', 31" can emit different signals 33', 33" in opposite directions. In the example shown, a transmitter 31' is provided on an upper side of the elevator car 11, which transmitter emits signals 33' vertically upwards, whereas a transmitter 31" is provided on an underside of the elevator car 11, the signals 33" of which are emitted vertically downward. Since the two signals 33', 33" are different, the drone 5 can recognize whether it is located above or below the elevator car 11 by analyzing the signals 33', 33".

In addition, the two signals 33', 33" can be emitted with different intensities, depending on the direction of movement 29 in which the elevator car 11 is currently moving. Along the direction of movement 29, the signals 33" can accordingly be emitted with a higher intensity than the signals 33' in the opposite direction. The drone 5 can therefore be warned in good time in advance of the elevator car 11 that is moving in the direction of movement 29.

In a simple embodiment, the two transmitters 31', 31" can be provided as simple light sources. For example, the transmitter 31' provided on the upper side of the elevator car 11 can be designed as a green light source and the transmitter 31" provided on the underside can be a red light source. In its sensor system 21, the drone 5 can have color-sensitive and intensity-sensitive light sensors and can thus recognize, by analyzing the light emitted by the transmitters 31', 31", whether the elevator car 11 is moving toward or away from the drone 5, and when an evasive maneuver must be initiated at the latest.

As a third technology, the elevator system 3 can provide the elevator shaft segment information in the form of component location/movement information which indicates where and/or to where the elevator car 11 is currently moving. This component location/movement information can be transmitted directly to the drone 5, for example with the aid of a radio signal. Alternatively, the elevator controller 15 can transmit this information to an external apparatus 35, such as a server in an elevator control center or a data cloud, from which the information can then in turn be retrieved by the drone 5. In order to be able to determine the volume segment 23 which is off-limits for it, the drone 5 in this case additionally takes into account drone location/movement information in itself, which indicates where the drone 5 currently is in the elevator shaft 7 and/or to where it is currently moving. The drone 5 can ascertain this information, for example, using its own sensor system 21 and/or with the aid of the inspection sensor 19. Based on the two items of location/movement information, the drone 5 can then recognize when it is located relatively close to the position of the elevator car 11 and/or the drone 5 and the elevator car 11 are moving toward one another relative to one another. Accordingly, the drone 5 can initiate suitable evasive maneuvers.

Different strategies are possible as evasive maneuvers. For example, the drone 5 can initiate a flight in a suitable direction, i.e. upwards or downwards, as an evasive maneuver, in order to "flee" before an approaching elevator component 9. If the off-limits volume segment 23 does not fill the entire cross-section of the elevator shaft 7, the drone 5 can evade the approaching elevator component 9 by displacing its flight path horizontally and then flying laterally past the off-limits volume segment 23. Alternatively, recesses can be provided in the elevator shaft 7, into which recesses the drone 5 can "flee" in the event of an approaching elevator component 9, and can remain there until the elevator component 9 has moved past the drone 5. As a further alternative, an elevator system 3 can have a plurality of elevator shafts 7 arranged next to one another, in which a plurality of displaceable elevator components 9 move. In this case, the drone 5 can move out of the way of an approaching elevator component 9 by temporarily diverting into an adjacent elevator shaft 7.

Finally, it should be noted that terms such as "comprising," "having," etc. do not exclude other elements or steps, and terms such as "a" or "an" do not exclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for controlling a flight-capable drone in an elevator shaft of an elevator system, the method comprising the steps of:
   the drone receiving elevator shaft segment information, provided by the elevator system, that indicates a volume segment of the elevator shaft currently designated by the elevator system to be off-limits for the drone; wherein the drone automatically determines the flight path taking into account the received elevator shaft segment information; and
   controlling the drone along the determined flight path wherein the drone travels in the elevator shaft exclusively outside the volume segment designated as off-limits for the drone;
   wherein at least one transmitter is arranged on a component of the elevator system that is displaceable in the elevator shaft, the elevator shaft segment information being provided by the at least one transmitter emitting a signal that decreases in intensity as a function of a distance from the component.

2. The method according to claim 1 wherein the elevator shaft segment information is provided by the elevator system based upon location/movement information that indicates where a component of the elevator system that is displaceable in the elevator shaft is currently located and/or to where the component is currently moving in the elevator shaft.

3. The method according to claim 1 wherein the elevator shaft segment information is provided by the elevator system based upon relative information that indicates where a component of the elevator system that is displaceable in the elevator shaft is currently located in relation to the drone and/or how the component is currently moving relative to the drone.

4. The method according to claim 1 wherein the elevator shaft segment information is provided by the elevator system taking into account speed information that indicates a speed at which a component of the elevator system that is displaceable in the elevator shaft is currently moving through the elevator shaft and/or a maximum speed at which the drone can move within the elevator shaft.

5. The method according to claim 1 wherein the elevator shaft segment information is provided based upon a signal receivable by the drone, the signal being generated locally within the volume segment of the elevator shaft that is currently designated by the elevator system as off-limits for the drone, and wherein the signal is different inside the volume segment than outside the volume segment.

6. The method according to claim 1 wherein a plurality of transmitters are arranged in the elevator shaft, each of the transmitters being arranged at a different height along the elevator shaft, and wherein the elevator shaft segment information is provided by a signal emitted by transmitters that are within the volume segment of the elevator shaft that is currently designated as off-limits by the elevator system for the drone, the signal being different from a signal emitted by the transmitters outside the volume segment.

7. The method according to claim 1 wherein the elevator shaft segment information is provided by the at least one transmitter transmitting a signal in a direction that the component is currently moving, said signal being distinguishable from any signal transmitted in a direction opposite to the direction that the component is currently moving.

8. The method according to claim 7 wherein the elevator shaft segment information is provided by another transmitter transmitting a signal in a direction opposite from the signal transmitted by the at least one transmitter.

9. The method according to claim 1 wherein the elevator shaft segment information is only provided when the component is moving.

10. The method according to claim 1 wherein the elevator shaft segment information is provided by the elevator system as component location/movement information that indicates where a component of the elevator system that is displaceable in the elevator shaft is currently located and/or to where the component is currently moving, wherein the drone determines the flight path taking into account both the component location/movement information and drone location/movement information that indicates where the drone is currently located in the elevator shaft and/or to where the drone is currently moving in the elevator shaft.

11. An elevator system inspection arrangement comprising:
an elevator system having an elevator shaft, a component displaceable in the elevator shaft, a drive moving the component, and an elevator controller controlling displacement movements of the component;
at least one transmitter arranged on the component, the elevator shaft segment information being provided by the at least one transmitter emitting a signal that decreases in intensity as a function of a distance from the component; and
a flight-capable drone positioned in the elevator shaft and controlled by the method according to claim 1.

12. The elevator system inspection arrangement according to claim 11 including a plurality of transmitters arranged in the elevator shaft, wherein each of the transmitters is arranged at a different height along the elevator shaft, and wherein the elevator shaft segment information is provided by a signal emitted by transmitters that are within the volume segment of the elevator shaft that is currently designated as off-limits by the elevator system for the drone, the signal being different from a signal emitted by the transmitters outside the volume segment.

13. The elevator system inspection arrangement according to claim 11 wherein the elevator shaft segment information is only provided when the component is moving.

* * * * *